(12) United States Patent
Francisco et al.

(10) Patent No.: US 7,578,369 B2
(45) Date of Patent: Aug. 25, 2009

(54) MIXED-FLOW EXHAUST SILENCER ASSEMBLY

(75) Inventors: Jay M. Francisco, Chula Vista, CA (US); James C. Napier, San Diego, CA (US); Dan G. Sapiro, Poway, CA (US); Behzad Hagshenas, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 34 days.

(21) Appl. No.: 11/903,973

(22) Filed: Sep. 25, 2007

(65) Prior Publication Data

US 2009/0078496 A1 Mar. 26, 2009

(51) Int. Cl.
*F02K 1/00* (2006.01)
(52) U.S. Cl. .................. 181/213; 181/220; 244/1 N
(58) Field of Classification Search ............ 181/213, 181/220, 258, 262, 283, 210, 211, 212, 214, 181/250, 273, 276; 244/1 N; 431/114; 415/119; 60/725, 772, 752, 748
See application file for complete search history.

(56) References Cited

U.S. PATENT DOCUMENTS

| | | | | |
|---|---|---|---|---|
| 2,424,765 A * | 7/1947 | McCollum | ............... | 126/116 R |
| 3,011,584 A * | 12/1961 | Lemmerman et al. | ....... | 181/217 |
| 3,489,377 A * | 1/1970 | Wright et al. | ............ | 219/85.15 |
| 3,572,466 A * | 3/1971 | Hom et al. | .................. | 181/220 |
| 3,575,261 A * | 4/1971 | Medawar et al. | ............ | 181/220 |
| 3,620,329 A * | 11/1971 | Wenzlaff | ..................... | 181/218 |
| 3,715,009 A | 2/1973 | Smith et al. | | |
| 3,739,872 A | 6/1973 | McNair | | |
| 4,060,985 A * | 12/1977 | Fukushima | ................... | 60/319 |
| 4,124,091 A * | 11/1978 | Mizusawa | .................... | 181/231 |
| 4,215,536 A * | 8/1980 | Rudolph | ...................... | 60/262 |
| 4,279,325 A * | 7/1981 | Challis | ....................... | 181/211 |
| 4,372,110 A * | 2/1983 | Fletcher et al. | ............... | 60/262 |
| 4,421,455 A | 12/1983 | Tomren | | |
| 4,436,481 A | 3/1984 | Linder | | |
| 4,531,356 A | 7/1985 | Linder | | |
| 4,577,462 A * | 3/1986 | Robertson | .................... | 60/262 |
| 4,645,032 A | 2/1987 | Ross et al. | | |
| 4,828,932 A * | 5/1989 | Morimoto et al. | ........... | 428/608 |
| 4,830,312 A * | 5/1989 | Hain et al. | ................ | 244/17.11 |
| 4,927,342 A | 5/1990 | Kim et al. | | |
| 5,097,656 A | 3/1992 | Napier | | |
| 5,140,819 A | 8/1992 | Napier et al. | | |
| 5,162,620 A | 11/1992 | Ross et al. | | |
| 5,184,455 A * | 2/1993 | Ewing et al. | .................. | 60/772 |
| 5,265,408 A * | 11/1993 | Sheoran et al. | ............... | 60/782 |
| 5,291,672 A * | 3/1994 | Brown | .......................... | 60/262 |
| 5,351,489 A * | 10/1994 | Okamoto et al. | .............. | 60/740 |
| 5,373,691 A | 12/1994 | Gardner et al. | | |

(Continued)

*Primary Examiner*—Jeffrey Donels
*Assistant Examiner*—Forrest M Phillips
(74) *Attorney, Agent, or Firm*—Kinney & Lange, P.A.

(57) ABSTRACT

An exhaust silencer assembly comprising a casing having an exhaust gas entrance opening, an exhaust gas exit opening, and a cooling air inlet opening, and an acoustic-attenuating porous liner disposed within an interior chamber of the casing, thereby dividing the interior chamber into an inner region located between the exhaust gas entrance opening and the exhaust gas exit opening, and an outer region located between the acoustic-attenuating porous liner and the casing, where the cooling air inlet opening is located at the outer region.

23 Claims, 6 Drawing Sheets

U.S. PATENT DOCUMENTS

| | | | |
|---|---|---|---|
| 5,398,496 A * | 3/1995 | Taylor et al. | 60/796 |
| 5,414,232 A * | 5/1995 | Wilson | 181/292 |
| 5,491,308 A | 2/1996 | Napier et al. | |
| 5,605,046 A * | 2/1997 | Liang | 60/752 |
| 5,628,193 A * | 5/1997 | Kington et al. | 60/752 |
| 5,655,359 A * | 8/1997 | Campbell et al. | 60/772 |
| 5,687,563 A | 11/1997 | Thompson, Jr. | |
| 5,706,651 A | 1/1998 | Lillibridge et al. | |
| 5,738,184 A * | 4/1998 | Masuda et al. | 181/262 |
| 5,857,327 A * | 1/1999 | Sato et al. | 60/302 |
| 5,904,317 A * | 5/1999 | Elliott et al. | 244/1 N |
| 5,916,125 A * | 6/1999 | Snyder | 60/772 |
| 5,941,076 A * | 8/1999 | Sandelis | 60/752 |
| 5,943,856 A | 8/1999 | Lillibridge et al. | |
| 5,987,877 A * | 11/1999 | Steiner | 60/39.08 |
| 6,000,210 A * | 12/1999 | Negulescu | 60/772 |
| 6,092,360 A * | 7/2000 | Hoag et al. | 60/783 |
| 6,094,907 A | 8/2000 | Blackner | |
| 6,248,423 B1 * | 6/2001 | Clarke et al. | 428/131 |
| 6,282,881 B1 * | 9/2001 | Beutin et al. | 60/39.08 |
| 6,415,595 B1 | 7/2002 | Wilmot, Jr. et al. | |
| 6,427,801 B1 * | 8/2002 | Dugan | 181/215 |
| 6,439,340 B1 * | 8/2002 | Shirvan | 181/213 |
| 6,439,540 B1 | 8/2002 | Tse | |
| 6,546,733 B2 * | 4/2003 | North et al. | 60/772 |
| 6,640,544 B2 * | 11/2003 | Suenaga et al. | 60/725 |
| 6,695,094 B2 | 2/2004 | Moffat et al. | |
| 6,704,625 B2 | 3/2004 | Albero et al. | |
| 6,837,051 B2 * | 1/2005 | Mandai et al. | 60/725 |
| 6,860,098 B2 * | 3/2005 | Suenaga et al. | 60/39.23 |
| 6,896,099 B2 * | 5/2005 | Porte et al. | 181/214 |
| 6,931,855 B2 * | 8/2005 | Glessner et al. | 60/772 |
| 6,942,181 B2 * | 9/2005 | Dionne | 244/57 |
| 6,957,569 B1 | 10/2005 | Napier et al. | |
| 6,964,170 B2 * | 11/2005 | Alkabie | 60/772 |
| 6,973,790 B2 * | 12/2005 | Suenaga et al. | 60/725 |
| 7,093,447 B2 | 8/2006 | Thompson et al. | |
| 7,104,072 B2 | 9/2006 | Thompson | |
| 7,124,856 B2 * | 10/2006 | Kempton et al. | 181/284 |
| 7,267,297 B2 * | 9/2007 | Campbell et al. | 244/1 N |
| 7,314,113 B2 * | 1/2008 | Doll | 181/225 |
| 7,350,619 B2 * | 4/2008 | Williams | 181/214 |
| 7,431,127 B2 * | 10/2008 | de Borchgrave et al. | 181/229 |
| 7,461,719 B2 * | 12/2008 | Tobik et al. | 181/213 |
| 2002/0015640 A1 * | 2/2002 | Nishiyama et al. | 415/119 |
| 2002/0139120 A1 | 10/2002 | Sheoran et al. | |
| 2004/0172948 A1 * | 9/2004 | Bellucci et al. | 60/772 |
| 2004/0211188 A1 * | 10/2004 | Alkabie | 60/772 |
| 2005/0268593 A1 * | 12/2005 | Hagshenas | 60/39.08 |
| 2006/0043236 A1 * | 3/2006 | Campbell et al. | 244/1 N |
| 2006/0060417 A1 * | 3/2006 | Williams | 181/214 |
| 2007/0068167 A1 * | 3/2007 | Patel et al. | 60/772 |
| 2008/0127912 A1 * | 6/2008 | Onodera et al. | 123/2 |
| 2008/0169152 A1 * | 7/2008 | Furuya | 181/224 |
| 2008/0217101 A1 * | 9/2008 | Crosta et al. | 181/213 |
| 2008/0302083 A1 * | 12/2008 | Sloan et al. | 60/226.1 |

* cited by examiner

MIXED-FLOW EXHAUST SILENCER ASSEMBLY

BACKGROUND

The present invention relates to noise attenuation systems. In particular, the present invention relates to noise attenuation systems for use with gas turbine engines such as aircraft auxiliary power unit (APU) turbine engines.

Large commercial aircraft typically include on-board APU turbine engines, located in the tail sections of the aircraft, to provide electrical power and compressed air for systems throughout the aircraft. When an aircraft is on the ground, the primary propulsion engines of the aircraft are shut down, and the APU turbine engine provides the main source of power for a variety of systems, such as the environmental control systems, hydraulic pumps, electrical systems, and main engine starters. The APU turbine engine may also provide power during in-flight operations, such as for electrical and pneumatic systems.

In many gas turbine engine applications, particularly those in which the engine is used in conjunction with a commercial passenger aircraft, there is a widespread demand by the airline industry to maintain noise levels below defined limits. This is particularly important at ground service stations for the aircraft, where ground crew load and unload luggage, fuel and provision the aircraft, and remove waste materials from the aircraft. Under these conditions, the aircraft APU is the turbine engine of interest.

Noise generated during the operation of an APU turbine engine typically includes low frequency noise generated during the combustion process within the turbine engine, and high frequency noise generated by the mixing of gases at the compressor portion of the turbine engine. The low frequency noise is typically attenuated with an exhaust silencer placed downstream from the APU exhaust diffuser. This allows the exhaust silencer to dissipate acoustic energy of the low-frequency noise as the noise travels downstream from the APU exhaust diffuser. However, positioning the exhaust silencer downstream from the exhaust diffuser exposes the exhaust silencer to the exhaust gases emitted from the APU exhaust diffuser. The exhaust gases can convectively heat the exhaust silencer to elevated temperatures above the auto-ignition temperature of the fuel (e.g., greater than 600° C.). Such elevated temperatures can degrade the structural integrity of the exhaust silencer, thereby requiring the use of high-temperature materials and insulation layers. High-temperature materials and insulation layers, however, undesirably increase the cost and weight of the exhaust silencer. As such, there is a need for an exhaust silencer assembly that is suitable for attenuating exhaust noise generated from a turbine engine, and that is capable of reducing the convective heat transfer of the exhaust gases.

SUMMARY

The present invention relates to an exhaust silencer assembly that includes a casing and an acoustic-attenuating porous liner. The casing defines an interior chamber, and has an exhaust gas entrance opening, an exhaust gas exit opening, and a cooling air inlet opening. The acoustic-attenuating porous liner is disposed within the interior chamber of the casing, thereby dividing the interior chamber into an inner region located between the exhaust gas entrance opening and the exhaust gas exit opening, and an outer region located between the acoustic-attenuating porous liner and the casing, where the cooling air inlet opening is located at the outer region.

DETAILED DESCRIPTION

Figure 1:
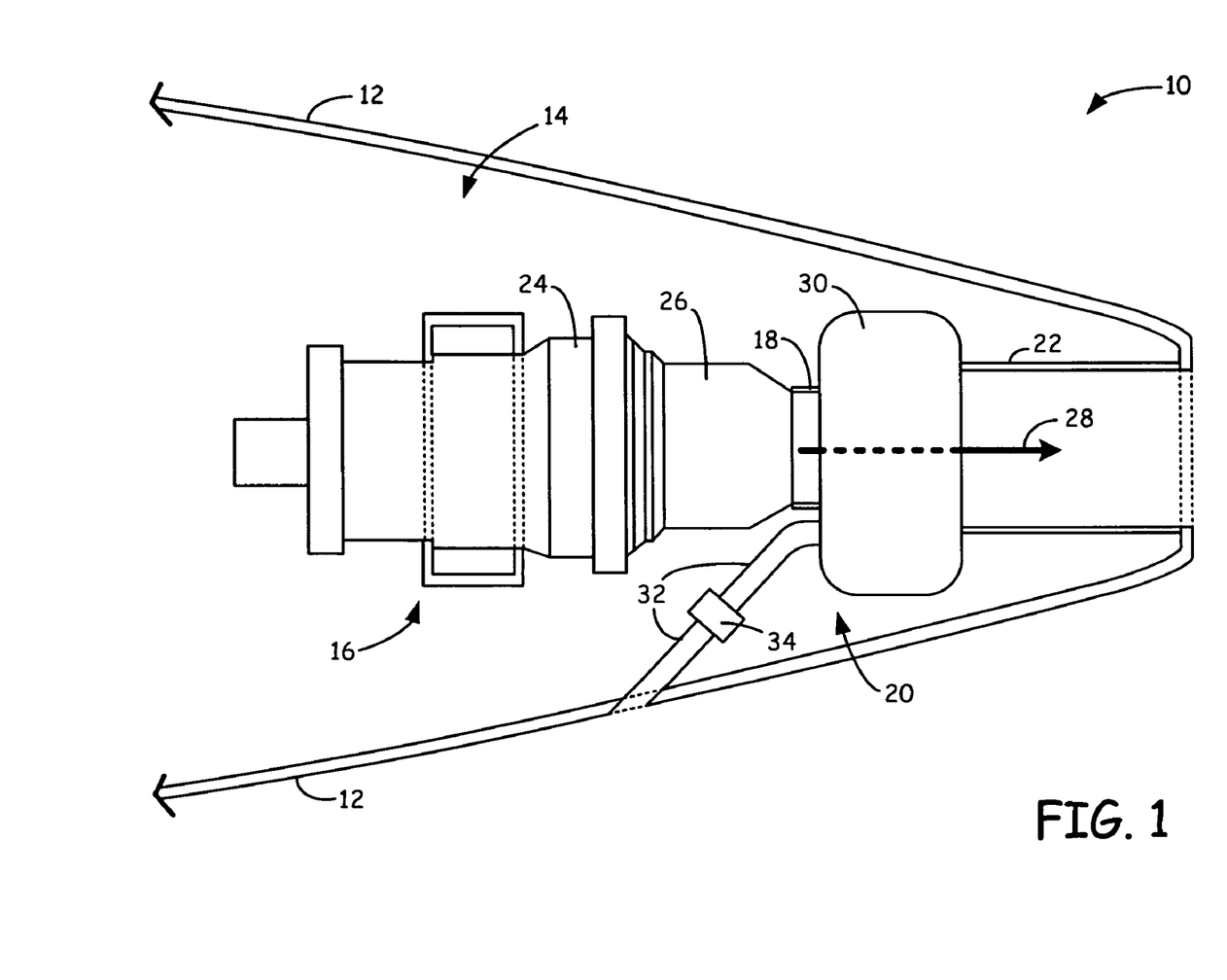
FIG. 1 is a top schematic view of an aircraft tail section, which includes an exhaust silencer assembly in use with an on-board APU turbine engine, where the exhaust silencer assembly includes an air inlet duct.

FIG. 1 is a top schematic view of aircraft tail section 10, which includes exterior structure 12 and APU nacelle 14. APU nacelle 14 is a compartment within exterior structure 12 that contains APU 16, coupler 18, exhaust silencer assembly 20, and exhaust pipe 22, where exhaust silencer assembly 20 is configured to attenuate noise generated by APU 16 during operation. APU 16 is an on-board gas turbine engine that includes turbine portion 24 and exhaust diffuser 26, and which provides electrical power and/or a source of pressurized air to the aircraft or its components. APU 16 also includes additional components (not shown) that facilitate the operation of APU 16 and the transfer of electrical power and/or pressurized air (e.g., air inlet ducts, gearboxes, and generators). While shown in aircraft tail section 10, APU 16 and exhaust silencer assembly 20 may alternatively be located in any suitable location on an aircraft.

Coupler 18 is a rigid annular shaft disposed downstream from exhaust diffuser 26, and which secures exhaust silencer assembly 20 to APU 16. The terms "upstream" and "downstream" are used herein with reference to the direction of the exhaust gas flow from APU 16, as represented by flow arrow 28 in FIG. 1. Exhaust silencer assembly 20 is disposed downstream from coupler 18 and exhaust diffuser 26, and includes attenuation stage 30, air inlet duct 32, and heat exchanger 34. Attenuation stage 30 is secured between coupler 18 and exhaust pipe 22 and is configured to attenuate noise generated by APU 16 during operation. Air inlet duct 32 is a channel that extends from exterior structure 12 to attenuation stage 30, thereby allowing cooling air to flow to attenuation stage 30. Air inlet duct 32 could include heat exchanger 34 (e.g., an oil cooler) disposed along air inlet duct 32 for cooling the oil within APU 16 with air flowing through air inlet duct 32. In a first alternative embodiment, air inlet duct 32 may receive air from an active air source (e.g., a discharge fan), thereby functioning as an active source of cooling air for attenuation region 30. In a second alternative embodiment, air inlet duct 32 may split off from a primary air inlet duct (not shown) that engages with APU 16 or may receive air from the APU nacelle 14.

Exhaust pipe 22 extends from exhaust silencer assembly 20, and provides a channel for expelling the spent combustion exhaust gases from aircraft tail section 10. During the course of operation, turbine portion 24 of APU 16 compresses combustion air, adds fuel, and combusts the resulting fuel/air mixture. The resulting hot, high-pressure combustion gas then expands through a turbine stage (not shown) within turbine portion 24. The resulting rotation of the turbines is used to generate electrical power for associated devices of the aircraft (not shown). As shown by flow arrow 28, the spent combustion exhaust gases exit through exhaust diffuser 26 and coupler 18, and flow through attenuation stage 30 to exhaust pipe 22.

While operating, APU 16 generates low frequency noise that travels downstream from exhaust diffuser 26. To attenuate at least a portion of this noise, exhaust silencer assembly 20 is located downstream of exhaust diffuser 26, thereby allowing the aircraft to comply with aviation noise standards. This location, however, exposes attenuation stage 30 to the high temperatures of the exhaust gases. As discussed above, such temperatures may convectively heat downstream components to elevated temperatures that are not desired. To reduce the convective heat transfer from the exhaust gases to attenuation stage 30, air inlet duct 32 directs cooling air to attenuation stage 30, thereby reducing the thermal build up within attenuation stage 30. This precludes the need to use high-temperature materials and insulation layers, which correspondingly reduces the cost and weight of attenuation stage 30.

While exhaust silencer assembly 20 is shown in FIG. 1 with a single attenuation component (i.e., attenuation stage 30), exhaust silencer assembly 20 may alternatively include additional numbers of attenuation stages to attenuate noise generated from APU 16. For example, exhaust silencer assembly 20 may include multiple attenuation stages similar to attenuation stage 30, where each attenuation stage differs in size to attenuate a wide band of noise frequencies. In these alternative embodiments, one or more of the attenuation stages may include an air inlet duct 32 to receive cooling air.

Figure 2:
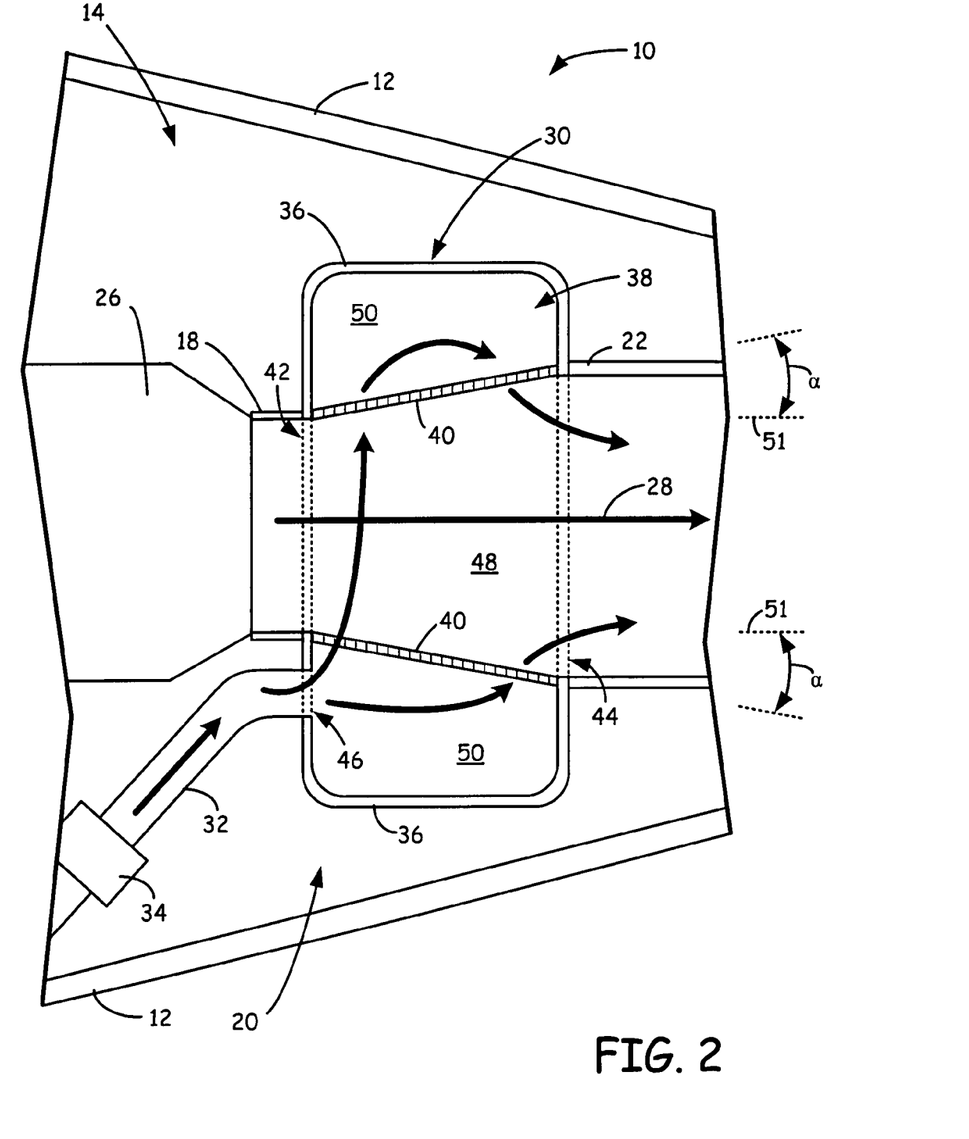
FIG. 2 is an expanded view of the aircraft tail section, which illustrates the interior of an attenuation stage of the exhaust silencer assembly.

FIG. 2 is an expanded view of aircraft tail section 10, which illustrates the interior of attenuation stage 30 and the flow paths of the cooling air within attenuation stage 30. As shown, attenuation stage 30 includes casing 36, interior chamber 38, and acoustic liner 40. Casing 36 is an annular exterior structure of attenuation stage 30, which includes entrance opening 42, exit opening 44, and duct opening 46. Interior chamber 38 is a hollow region within casing 36, and is accessible by entrance opening 42, exit opening 44, and duct opening 46. Entrance opening 42 is the upstream opening in casing 36 and is disposed adjacent to coupler 18. Exit opening 44 is the downstream opening in casing 36 and is disposed adjacent to exhaust pipe 22. Accordingly, entrance opening 42 and exit opening 44 provide a flow path for the exhaust gases to pass through attenuation stage 30. Duct opening 46 is a second upstream opening in casing 36 located at an axially offset position from entrance opening 42, and provides a flow path for cooling air to pass into interior chamber 38 from air inlet duct 32.

Acoustic liner 40 is an annular liner disposed within interior chamber 38, and is secured to casing 36 adjacent entrance opening 42 and exit opening 44. Acoustic liner 40 divides interior chamber 38 into an axially inner region (referred to as inner region 48) and an axially outer region (referred to as outer region 50). Inner region 48 is the region through which the exhaust gases pass through toward exhaust pipe 22, and has a first end at entrance opening 42 and a second end at exit opening 44. Outer region 50 extends annularly around inner region 48 and is the region in which duct opening 46 is located. This allows cooling air to flow around within outer region 50 to cool casing 36 during operation. As shown in FIG. 2, the diameter of acoustic liner 40 increases from entrance opening 42 to exit opening 44 at an angle α, where the angle α is an angle relative to an axis that is orthogonal to the planes of entrance opening 42 and exit opening 44 (referred to as axis 51). Examples of suitable angles α range from greater than zero degrees to less than about 45 degrees, with particularly suitable angles α ranging from about 5 degrees to about 20 degrees. The increasing diameter of acoustic liner 40 expands the flow area, enhances the reduction process to draw air from air inlet duct 32 into interior chamber 38, and reduces noise and the exhaust flow velocity.

Acoustic liner 40 is desirably a porous liner that allows cooling air and combustion gases to pass through, while also dissipating acoustic energy. In one embodiment, acoustic liner 40 is an annular metallic sheet containing a plurality of passage holes. The passage holes may exhibit a variety of geometric shapes, such as circles, ovals, elongated slots, and combinations thereof. For embodiments in which the passage holes are substantially circular, examples of suitable average holes sizes include diameters ranging from about 1 millimeter to about 10 millimeters, with particularly suitable average holes sizes including diameters ranging from about 2 millimeter to about 5 millimeters.

The combined surface areas of the passage holes are desirably high enough to allow the cooling air to pass through without pressure build up within outer region 50, while also being low enough to dissipate the acoustic energy of the low frequency noise traveling downstream from exhaust diffuser 26. Examples of suitable combined surface areas of the passage holes range from about 5% to about 40% of the total surface area of acoustic liner 40, with particularly suitable combined surface areas ranging from about 10% to about 30% of the total surface area of acoustic liner 40, and with even more particularly suitable combined surface areas ranging from about 15% to about 20% of the total surface area of acoustic liner 40.

During the course of operation, low frequency noise travels with the exhaust gases downstream from exhaust diffuser 26 to attenuation stage 30. As the noise travels through inner region 48, acoustic liner 40 dissipates at least a portion of the acoustic energy, thereby attenuating the noise. While the exhaust gases travel through inner region 48 of attenuation stage 30, cooling air enters outer region 50 of attenuation stage 30 from air inlet duct 32. As illustrated by the air flow arrows in FIG. 2, the cooling air flows circumferentially around acoustic liner 40, and penetrates through acoustic liner 40 via the passage holes to mix with the exhaust gases. This cools the exhaust gases as the exhaust gases travel through attenuation stage 30 to exhaust pipe 22. Additionally, allowing the cooling air to pass through acoustic liner 40 reduces the temperature of acoustic liner 40, which reduces high-temperature oxidation, and also reduces risk of the passage holes of acoustic liner 40 being clogged with exhaust soot.

Introducing the cooling air adjacent casing 36 of attenuation stage 30 also reduces the amount of convective heat that is transferred from the exhaust gases to casing 36. As discussed above, this precludes the need for fabricating casing 36 with high-temperature materials and insulating layers, which can reduce the cost and weight of casing 36. Additionally, the use of exhaust silencer assembly 20 precludes the need of an additional eductor system disposed adjacent exhaust diffuser 26. This further reduces the cost and weight of aircraft tail section 10. Accordingly, exhaust silencer assembly 20 performs the functions of a noise attenuation system and an eductor system.

Figure 3:
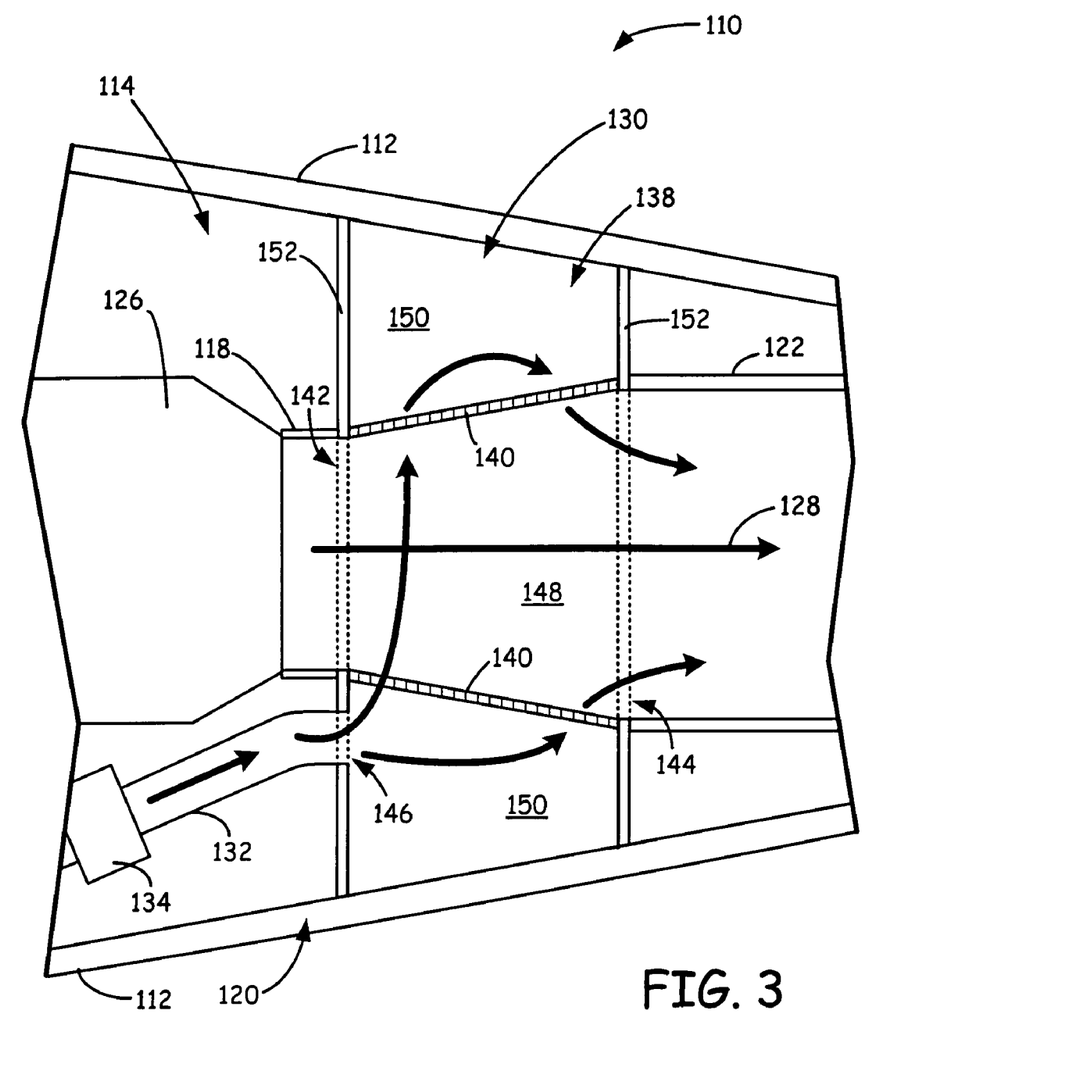
FIG. 3 is an expanded view of an aircraft tail section, which illustrates the interior of an attenuation stage of a first alternative exhaust silencer assembly that is integrated with the aircraft tail section and includes an air inlet duct.

FIGS. 3-6 are expanded views of alternative embodiments to exhaust silencer assembly 20 of aircraft tail section 10, where the reference numbers of corresponding components to aircraft tail section 10 are increased by 100, 200, 300, and 400, respectively. As shown in FIG. 3, aircraft tail section 110 includes exhaust silencer assembly 120, which is similar to exhaust silencer assembly 20 (shown in FIG. 2). Exhaust silencer assembly 120 includes attenuation stage 130, air inlet duct 132, and heat exchanger 134, which function in the same manner as the corresponding components of exhaust silencer assembly 20. However, attenuation stage 130 includes casing 152 in lieu of casing 36 (shown in FIG. 2), where casing 152 is integrated into exterior structure 112. As such, exhaust silencer assembly 120 has an integrated exhaust silencer design to reduce the required volume within APU nacelle 114. Accordingly, interior chamber 138 is a hollow region defined by exterior structure 112 and casing 152, and includes inner region 148 and outer region 150, where outer region 150 is annularly disposed between exterior structure 112 and acoustic liner 140.

Exhaust silencer assembly 120 operates in the same manner as exhaust silencer assembly 20. While the exhaust gases travel through inner region 148, cooling air enters outer region 150 from air inlet duct 132. As illustrated by the air flow arrows in FIG. 3, the cooling air flows circumferentially around acoustic liner 140, and penetrates through acoustic liner 140 via the passage holes to mix with the exhaust gases. This cools the exhaust gases as the exhaust gases travel through attenuation stage 130 to exhaust pipe 122. Introducing the cooling air adjacent exterior structure 112 and casing 152 reduces the amount of convective heat that is transferred from the exhaust gases to exterior structure 112 and casing 152. This precludes the need for fabricating exterior structure 112 and casing 152 with high-temperature materials and insulating layers, thereby reducing the cost and weight of aircraft tail section 110.

Figure 4:
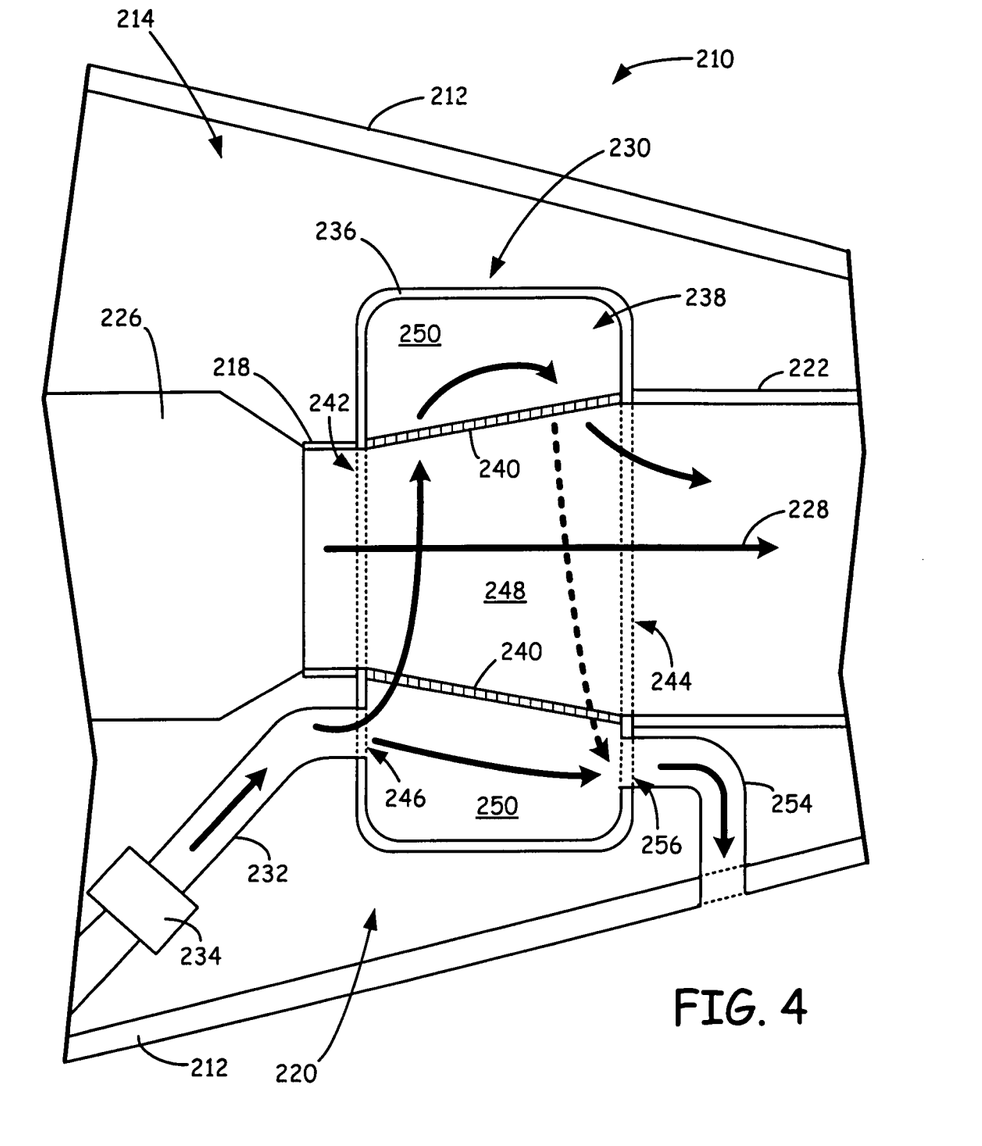
FIG. 4 is an expanded view of an aircraft tail section, which illustrates the interior of an attenuation stage of a second alternative exhaust silencer assembly that includes an air inlet duct and an overboard outlet duct.

FIG. 4 shows aircraft tail section 210, which includes exhaust silencer assembly 220. Exhaust silencer assembly 220 correspondingly includes attenuation stage 230, air inlet duct 232, and heat exchanger 234, which function in the same manner as the corresponding components of exhaust silencer assembly 20 (shown in FIG. 2). Additionally, exhaust silencer assembly 230 also includes overboard outlet duct 254, which is a channel that extends from casing 236 of exhaust silencer assembly 230 to exterior structure 212, thereby allowing the cooling air to flow overboard from aircraft tail section 210. Casing 236 also includes duct opening 256, which is a second downstream opening in casing 236 located at an axially offset position from exit opening 244, and provides a second flow path for cooling air to pass from outer region 250 to overboard outlet duct 254.

Overboard outlet duct 254 and duct opening 256 cause the flow paths of a substantial portion of the cooling air to remain within outer region 250, rather than penetrating through the passage holes of acoustic liner 240. During operation, cooling air enters outer region 250 of attenuation stage 230 from air inlet duct 232. In one embodiment, an active air source (not shown) is incorporated to force air through air inlet duct 232 and into outer region 250. As illustrated by the air flow arrows in FIG. 4, the cooling air flows circumferentially around acoustic liner 240, thereby cooling casing 236. While a portion of the cooling air penetrates through acoustic liner 240 via the passage holes to mix with the exhaust gases, a substantial portion of the cooling air flows around outer region 250 and exits through duct opening 256 and overboard outlet duct 254. This allows a substantial portion of the cooling air to remain adjacent casing 236 to further reduce the amount of convective heat that is transferred from the exhaust gases to casing 236.

While duct openings 232 and 256 are shown on the same side of attenuation stage 230 in FIG. 4, in alternative embodiments, duct opening 232 and 256 may be disposed at different locations along casing 236. For example, duct opening 256 may be disposed on the opposing lateral side of casing 236 relative to duct opening 232, thereby increasing the amount of air flow through outer region 250. In an additional alternative embodiment, casing 236 may be integrated with exterior structure 212 in the same manner as discussed above for attenuation stage 130 (shown in FIG. 3) to reduce the required volume within APU nacelle 214.

Figure 5:
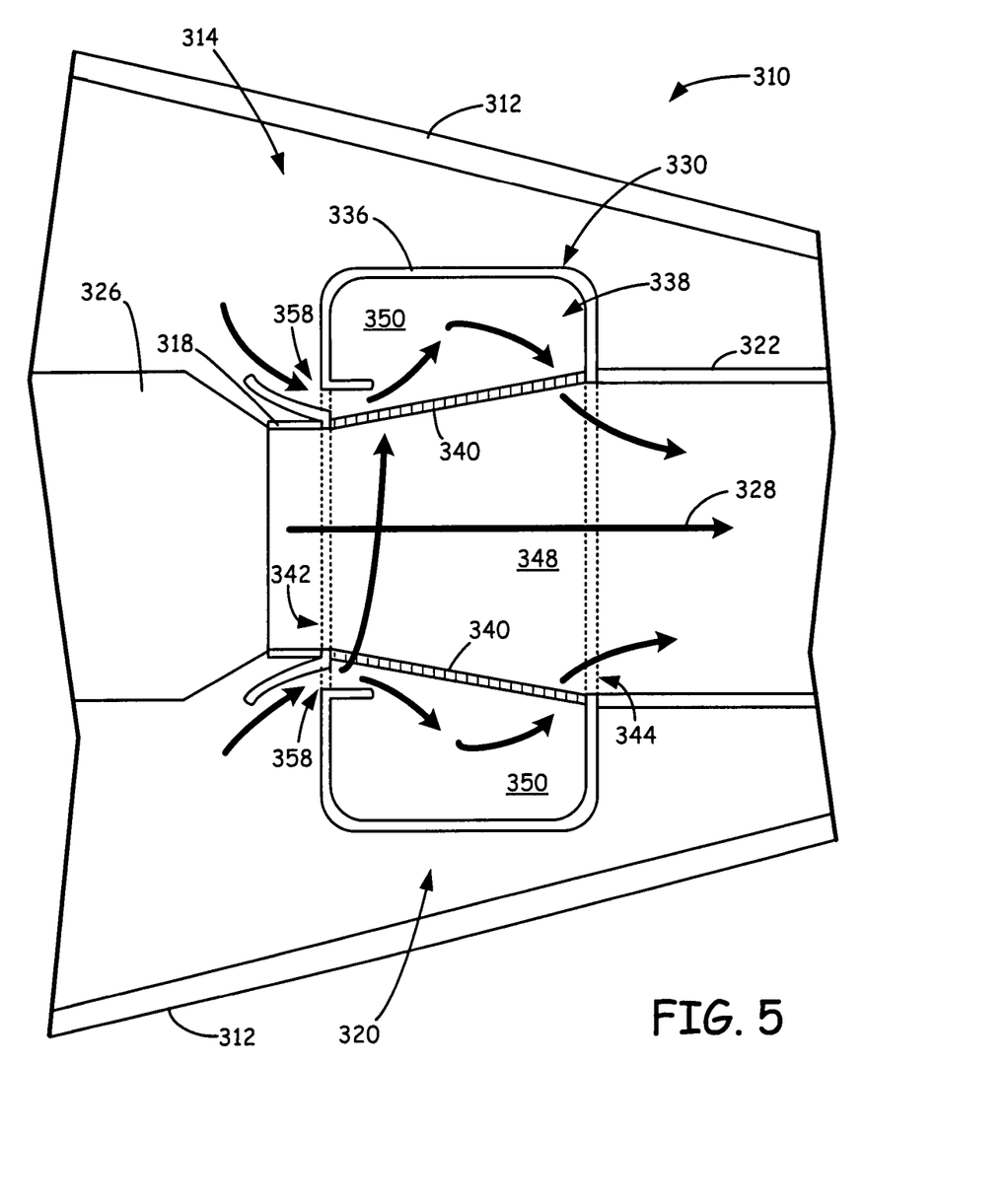
FIG. 5 is an expanded view of an aircraft tail section, which illustrates the interior of an attenuation stage of a third alternative exhaust silencer assembly that includes an eductor entrance.

FIG. 5 shows aircraft tail section 310, which includes exhaust silencer assembly 320. Exhaust silencer assembly 320 includes attenuation stage 330, but does not includes components corresponding to air inlet duct 32 and heat exchanger 34 of exhaust silencer assembly 20 (shown in FIG. 2). In this embodiment, casing 336 of attenuation stage 330 further includes eductor entrance 358, which is an upstream annular opening in casing 336 disposed at an axially offset position from entrance opening 342. Eductor entrance 358 is used in lieu of an air inlet duct (e.g., air inlet duct 32), and allows cooling air from APU nacelle 314 to flow into outer region 350. This further reduces the number of required components, thereby reducing the cost and weight of aircraft tail section 310.

Exhaust silencer assembly 320 operates in a similar manner as exhaust silencer assembly 20. While the exhaust gases travel through inner region 348 of attenuation stage 330, cooling air enters outer region 350 of attenuation stage 330 from APU nacelle 314 via eductor entrance 358. As illustrated by the air flow arrows in FIG. 5, the cooling air flows circumferentially around acoustic liner 340, and penetrates through acoustic liner 340 via the passage holes to mix with the exhaust gases. This cools the exhaust gases as the exhaust gases travel through attenuation stage 330 to exhaust pipe 322. Introducing the cooling air adjacent casing 336 reduces the amount of convective heat that is transferred from the exhaust gases to casing 336, thereby precluding the need for high-temperature materials and insulating layers. In an alternative embodiment, casing 336 may be integrated with exterior structure 312 in the same manner as discussed above for attenuation stage 130 (shown in FIG. 3) to reduce the required volume within APU nacelle 314.

Figure 6:
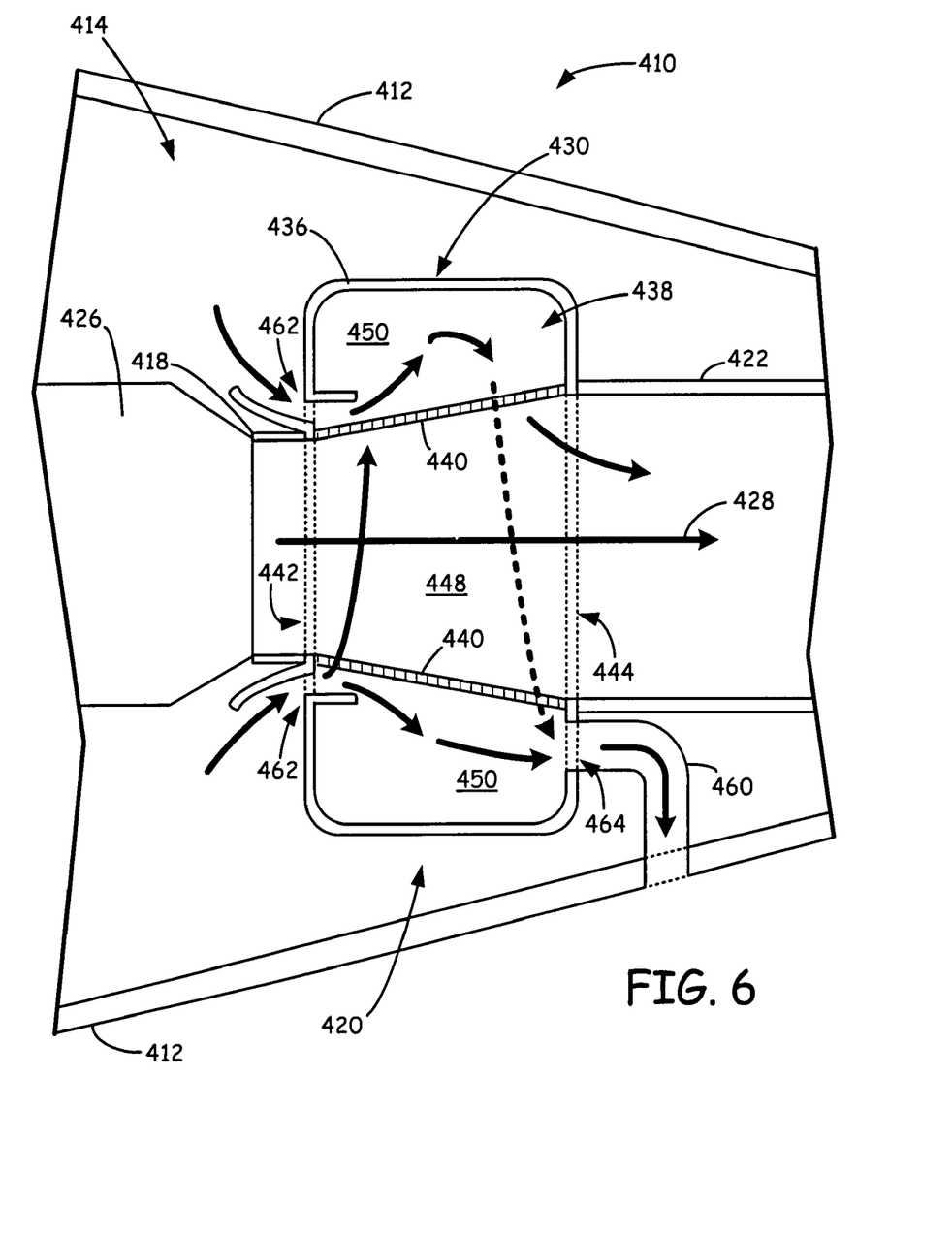
FIG. 6 is an expanded view of an aircraft tail section, which illustrates the interior of an attenuation stage of a fourth alternative exhaust silencer assembly that includes an eductor entrance and an overboard outlet duct.

FIG. 6 shows aircraft tail section 410, which includes exhaust silencer assembly 420. As shown, exhaust silencer assembly 420 includes attenuation stage 430 and overboard outlet duct 460, and combines the embodiments of exhaust silencer assembly 220 (shown in FIG. 4) and exhaust silencer assembly 320 (shown in FIG. 5). Accordingly, casing 436 of attenuation stage 430 further includes eductor entrance 462 and duct opening 464. Eductor entrance 462 is an upstream annular opening in casing 436 disposed at an axially offset position from entrance opening 442, and functions in the same manner discussed above for eductor entrance 358 (shown in FIG. 5). Accordingly, eductor entrance 462 is used in lieu of an air inlet duct (e.g., air inlet duct 32, shown in FIG. 1), and allows cooling air to flow from APU nacelle 414 into outer region 450. This further reduces the number of required components, thereby reducing the cost and weight of aircraft tail section 410.

Duct opening 464 is a second downstream opening in casing 436 located at an axially offset position from exit opening 444, which functions in the same manner as discussed above for duct opening 254 (shown in FIG. 4). As such, duct opening 464 provides a second flow path for cooling air to pass from outer region 450 to overboard outlet duct 460. Overboard outlet duct 460 is a channel that extends from casing 436 at duct opening 464 to exterior structure 412, thereby allowing the cooling air to flow overboard from aircraft tail section 410 in the same manner as discussed above for overboard outlet duct 256 (shown in FIG. 4).

During operation, cooling air enters outer region 450 of attenuation stage 430 from APU nacelle 414 via eductor entrance 462. In one embodiment, an active air source (not shown) is incorporated to force air through eductor entrance 462 and into outer region 450. As illustrated by the air flow arrows in FIG. 6, the cooling air flows circumferentially around acoustic liner 440, thereby cooling casing 436. While a portion of the cooling air penetrates through acoustic liner 440 via the passage holes to mix with the exhaust gases, a substantial portion of the cooling air flows around outer region 450 and exits through duct opening 464 and overboard outlet duct 460. This allows a substantial portion of the cooling air to remain adjacent casing 436 to further reduce the amount of convective heat that is transferred from the exhaust gases to casing 436. In an alternative embodiment, casing 436 may be integrated with exterior structure 412 in the same manner as discussed above for attenuation stage 130 (shown in FIG. 3) to reduce the required volume within APU nacelle 414.

Although the present invention has been described with reference to preferred embodiments, workers skilled in the art will recognize that changes may be made in form and detail without departing from the spirit and scope of the invention.

The invention claimed is:

1. An exhaust silencer assembly for use with a turbine engine, the exhaust silencer assembly comprising:
    a casing defining an interior chamber, and having an exhaust gas entrance opening, an exhaust gas exit opening, and a cooling air inlet opening; and
    an acoustic-attenuating porous liner disposed within the interior chamber of the casing, thereby dividing the interior chamber into an inner region located between the exhaust gas entrance opening and the exhaust gas exit opening, and an outer region located between the acoustic-attenuating porous liner and the casing, wherein the cooling air inlet opening is located at the outer region, so as to create a flow path from the cooling air inlet opening, through the acoustic-attenuating porous liner, to the exhaust gas exit opening.

2. The exhaust silencer assembly of claim 1, further comprising an air inlet duct secured to the casing at the cooling air inlet opening and forming part of the flow path with the cooling air inlet opening, through the acoustic-attenuating porous liner, to the exhaust gas exit opening.

3. The exhaust silencer assembly of claim 1, wherein the casing is integrated with an exterior structure of an aircraft.

4. The exhaust silencer assembly of claim 1, wherein the acoustic-attenuating porous liner comprises a plurality of passage holes that have a combined surface area ranging from about 5% to about 40% of a total surface area of the acoustic-attenuating porous liner.

5. The exhaust silencer assembly of claim 4, wherein the combined surface area of the plurality of passage holes ranges from about 10% to about 30% of the total surface area of the acoustic-attenuating porous liner.

6. The exhaust silencer assembly of claim 1, wherein the acoustic-attenuating porous liner has a diameter that increases from the exhaust gas entrance opening to the exhaust gas exit opening.

7. The exhaust silencer assembly of claim 1, further comprising an outboard outlet duct secured to the casing at the outer region, wherein the outboard outlet duct and the exhaust gas exit opening are positioned on opposite sides of the acoustic-attenuating porous liner.

8. The exhaust silencer assembly of claim 1, wherein the cooling air inlet opening comprises an eductor entrance for receiving cooling air from an interior compartment of an aircraft.

9. The exhaust silencer assembly of claim 1, in combination with a gas turbine engine.

10. An exhaust silencer assembly for use with a turbine engine, the exhaust silencer assembly comprising:
    at least one attenuation stage comprising:
        a casing having an entrance opening configured to be positioned downstream from the turbine engine, an exit opening disposed downstream from the entrance opening; and a cooling air inlet opening; and
        an acoustic-attenuating porous liner disposed within the casing, thereby providing an inner region located between the entrance opening and the exit opening, and an outer region located between the acoustic-attenuating porous liner and the casing, wherein the cooling air inlet opening is located at the outer region, so as to create a flow path from the cooling air inlet opening, through the acoustic-attenuating porous liner, to the exit opening; and
    an air inlet duct secured to the casing of the at least one attenuation stage at the cooling air inlet opening and forming part of the flow path with the cooling air inlet opening, through the acoustic-attenuating porous liner, to the exit opening.

11. The exhaust silencer assembly of claim 10, further comprising a heat exchanger disposed along the air inlet duct.

12. The exhaust silencer assembly of claim 10, wherein the casing is integrated with an exterior structure of an aircraft.

13. The exhaust silencer assembly of claim 10, wherein the casing also has an outlet opening located at the outer region, wherein the exhaust silencer assembly further comprises an outlet duct secured to the casing at the outlet opening, and wherein the outlet opening and the exit opening are positioned on opposite sides of the acoustic-attenuating porous liner.

14. The exhaust silencer assembly of claim 10, wherein the cooling air inlet opening is disposed at an axially offset location along the casing from the entrance opening.

15. The exhaust silencer assembly of claim 10, in combination with a gas turbine engine.

16. An exhaust silencer assembly for use with a turbine engine, the exhaust silencer assembly comprising:
    a casing having an exhaust gas passageway;
    a liner disposed within the casing and axially around the exhaust gas passageway, the liner comprising a plurality of passage holes configured to dissipate acoustic energy;
    an annular hollow region disposed between the casing and the liner; and
    at least one cooling air inlet opening extending through the casing into the annular hollow region.

17. The exhaust silencer assembly of claim 16, wherein the exhaust gas passageway comprises an entrance opening in the casing that is configured to be positioned downstream from the turbine engine, and an exit opening in the casing that is configured to be positioned upstream from an exhaust pipe.

18. The exhaust silencer assembly of claim 16, further comprising an air inlet duct secured to the casing at the at least one cooling air inlet opening and sharing a flow path with the at least one cooling air inlet opening.

19. The exhaust silencer assembly of claim 16, wherein the casing further includes an outlet opening located at the annular hollow region, wherein the exhaust silencer assembly further comprises an outlet duct secured to the casing at the outlet opening, and wherein the outlet duct and the exhaust gas passageway are positioned on opposite sides of the liner.

20. The exhaust silencer assembly of claim 16, wherein the at least one cooling air inlet opening comprises an eductor entrance for receiving cooling air from an interior compartment of an aircraft.

21. The exhaust silencer assembly of claim 16, wherein the plurality of passage holes have a combined surface area ranging from about 5% to about 40% of a total surface area of the liner.

22. The exhaust silencer assembly of claim 16, wherein the plurality of passage holes have an average holes size ranging from about 1 millimeter to about 10 millimeters.

23. The exhaust silencer assembly of claim 16, in combination with a gas turbine engine.

* * * * *